(12) United States Patent
Lemberg et al.

(10) Patent No.: US 9,877,178 B2
(45) Date of Patent: Jan. 23, 2018

(54) SYSTEM AND METHOD FOR DELIVERING WIRELESS EMERGENCY ALERTS TO RESIDENTIAL PHONES

(71) Applicant: United States Cellular Corporation, Chicago, IL (US)

(72) Inventors: Vyacheslav Lemberg, Long Grove, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 14/305,837

(22) Filed: Jun. 16, 2014

(65) Prior Publication Data

US 2015/0365809 A1 Dec. 17, 2015

(51) Int. Cl.
| | |
|---|---|
| *H04W 4/22* | (2009.01) |
| *H04M 11/04* | (2006.01) |
| *G10L 13/08* | (2013.01) |
| *G10L 13/00* | (2006.01) |

(52) U.S. Cl.
CPC .............. *H04W 4/22* (2013.01); *G10L 13/08* (2013.01); *H04M 11/045* (2013.01); *G10L 13/00* (2013.01)

(58) Field of Classification Search
CPC ....................................................... H04Q 7/20
USPC .............. 455/424, 426, 442, 561; 379/221.1, 379/201.12
See application file for complete search history.

(56) References Cited

U.S. PATENT DOCUMENTS

| | | | | | |
|---|---|---|---|---|---|
| 5,956,395 | A | * | 9/1999 | Song | H04M 3/424 379/157 |
| 6,404,880 | B1 | * | 6/2002 | Stevens | H04L 29/06 379/201.12 |
| 6,496,694 | B1 | * | 12/2002 | Menon | H04W 88/08 455/424 |
| 8,005,936 | B2 | * | 8/2011 | Motoyama | G06F 17/30067 709/223 |
| 8,050,281 | B2 | * | 11/2011 | Casey | G08B 27/00 370/401 |
| 2005/0153718 | A1 | * | 7/2005 | Dolph | H04W 4/18 455/466 |
| 2008/0076453 | A1 | * | 3/2008 | Cai | H04L 12/5835 455/466 |
| 2008/0096517 | A1 | * | 4/2008 | Appleyard | H04W 4/16 455/403 |
| 2012/0250501 | A1 | * | 10/2012 | Lee | H04W 76/007 370/229 |

(Continued)

*Primary Examiner* — Vladimir Magloire
*Assistant Examiner* — Majid Syed
(74) *Attorney, Agent, or Firm* — Leydig, Voit & Mayer, Ltd.

(57) ABSTRACT

A method and system for providing a Commercial Mobile Alert System paging notification, such as a text based emergency alert message, to a fixed wireless terminal system is provided. The fixed wireless terminal provides an interface between cellular wireless networks and a residential phone system comprising the fixed wireless network and one or more receivers configured to operate over a traditional Plain Old Telephone Service (POTS). The fixed wireless terminal receives the text based alert message and converts the alert message into an audio file that can be provided to the one or more residential phone receivers over the POTS network.

13 Claims, 6 Drawing Sheets

(56) References Cited

U.S. PATENT DOCUMENTS

2014/0287711 A1* 9/2014 Williams .......... H04M 1/72538
                                                    455/404.1
2015/0109122 A1* 4/2015 Stern .................... G08B 27/008
                                                    340/539.1

* cited by examiner

SYSTEM AND METHOD FOR DELIVERING WIRELESS EMERGENCY ALERTS TO RESIDENTIAL PHONES

FIELD OF THE INVENTION

This invention relates generally to the field of mobile wireless communications networks. More particularly, the invention is directed to supporting broadcast mobile wireless data communication services in such networks, and more specifically to providing emergency notification alert messages at a residential phone system.

BACKGROUND OF THE INVENTION

Mobile wireless systems today provide services going far beyond supporting voice communications. Modern mobile wireless services support a variety of voice and data services. With regard to data services, mobile wireless services support data sessions between data servers and smart mobile wireless devices running a variety of applications including: browsers, email, and text messaging. Several services have been developed to exploit the widespread adoption of data communications capabilities (e.g., text messaging as well as browsers) now incorporated into mobile wireless devices. A particular public service is the Commercial Mobile Alert System (CMAS)—also known as the Personal Localized Alerting Network (PLAN).

CMAS is an outgrowth of a broad initiative, the Integrated Public Alert and Warning System (IPAWS). IPAWS was established under an executive order to ensure that the American public promptly receives accurate alerts and warnings, regardless of communications technologies used to transmit the messages. The IPAWS infrastructure will include a mobile wireless alerting capability. Including mobile wireless alerts under the IPAWS system reflects the important role of mobile wireless technologies in disseminating alerts and warnings involving the public well-being. Providing critical alert information via mobile wireless devices enables the public to avoid danger or respond more quickly during crisis—potentially saving lives and preventing property damage. Through IPAWS, numerous public and private industry partners are working together to transform the current national alert and warning system to enable rapid dissemination of authenticated alert information over as many communications pathways as possible.

CMAS is a component of the IPAWS initiative having the goal of establishing an effective alerting network designed for disseminating emergency alerts, via wireless service providers, to mobile wireless devices such as cell phones. The Federal Communications Commission developed CMAS for incorporation into the wireless server provider networks. CMAS enables federal agencies to accept and aggregate alerts from the President of the United States, the National Weather Service (NWS) and emergency operations centers, and send the alerts to mobile wireless service providers. The mobile wireless service providers then broadcast the CMAS alerts to individual mobile wireless devices of subscribers via text (e.g., text messages). The types of alerts that are transmitted via CMAS include the following: alerts issued by the President, alerts relating to threats of physical harm (e.g., severe weather) and AMBER Alerts. CMAS relies upon the collaborative efforts of the Federal Emergency Management Agency (FEMA), the Department of Homeland Security Science and Technology Directorate (DHS S&T), the Alliance for Telecommunications Industry Solutions (ATIS), and the Telecommunications Industry Association (TIA).

CMAS is clearly one of the major components of the IPAWS. The CMAS component provides an interface to participating cellular mobile service providers for delivery of critical alert information to cellular phones in a danger zone. Specifically, the IPAWS CMAS capability will provide Federal, state, territorial, tribal and local government officials the ability to send 90 character, geographically targeted text alerts to the public, warning of imminent threats to life and property. An initial set of requirements of CMAS were developed by an advisory committee established by the FCC in accordance with the Warning, Alert and Response Network (WARN) Act of 2006.

A differentiator of the CMAS capability versus existing subscription-based text messaging alert services currently available in some localities is that the CMAS enables alert messages to be sent to mobile wireless devices within range of broadcasting cellular communications towers. The CMAS also utilizes communications channels and protocols in cellular systems that decrease the impact of network congestion on the ability of transmitters to transmit alert messages during times of emergency.

The IPAWS initiative led to establishing a specification for the interface between a federal alert aggregator/gateway and commercial service provider gateways. In November 2009, the Alliance for Telecommunication Industry Solutions/Telecommunications Industry Association (ATIS/TIA) Joint CMAS Working Group approved the "Joint ATIS/TIA CMAS Federal Alert Gateway to Commercial Mobile Service Providers (CMSP) Gateway Specification" (Specification). The Specification was adopted as the Government Interface Design Specification for the FEMA IPAWS federal alert aggregator/gateway on Dec. 7, 2009.

Thus, in summary the IPAWS initiative gave rise to CMAS. CMAS, in turn, is being established to ensure that emergency alerts and messages are quickly and efficiently disseminated to mobile wireless devices including at least text messaging capability. To that end, CMAS accepts messages from authorized federal, state, territorial, tribal, and local officials and distributes them to participating Commercial Mobile Service Providers (CMSP) for distribution to the public.

Regarding CMAS implementation in the diverse mobile wireless technologies, each cellular network technology (e.g., GSM, CDMA2000, LTE, etc.) has a well defined set of specifications for cell broadcast system. Each cell broadcast system includes an underlying technology for distributing emergency alerts. For example, the CMAS uses the diverse cell broadcast technologies of GSM, CDMA2000, and LTE networks to distribute emergency alerts originated from Federal, State, and Local Government Agencies in accordance with a well-defined emergency alert message interface.

Thus, a well defined interface exists between the message sources and gateways established by the mobile wireless service providers for broadcasting emergency messages to end users. The present message dissemination architecture is set up for providing text based messages to client devices enabled to communicate with one of the previously mentioned broadcast technologies.

BRIEF SUMMARY OF THE INVENTION

A method is described for receiving public warning messages at residential phones. The method includes receiving an alert message at a residential phone system, where the alert message is a text-based file providing a warning message. The method further includes converting the alert message from the text-based file to an audio file containing the warning message, and playing the audio file containing the warning message at a receiver of the residential phone system.

A non-transitory computer readable storage device is described for receiving public warning messages at residential phones. The computer readable storage device has computer executable instructions for performing the steps of receiving an alert message at a residential phone system, where the alert message is a text-based file providing a warning message. The storage device further has computer executable instructions for converting the alert message from the text-based file to an audio file containing the warning message, and playing the audio file containing the warning message at a receiver of the residential phone system.

Similarly, a described residential phone system is configured to receive public warning messages. The residential phone system includes a fixed wireless terminal and one or more receivers. The fixed wireless terminal is configured to receive a text based alert message from a wireless cellular network and convert the text based alert message to an audio based alert message. The one or more receivers are external to the fixed wireless terminal and in communication with the fixed wireless terminal, where the fixed wireless terminal transmits the audio based alert message to the one or more receivers for playing the audio based alert message.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Exemplary embodiments of the invention described herein address a need to provide an emergency alert message to fixed wireless terminal users. A fixed wireless terminal provides a residential phone system that allows users to make phone calls over a wireless cellular network using a corded or cordless telephone or receiver. Typically, the fixed wireless terminal is located at a user's residence and interfaces with the wireless cellular network. The fixed wireless terminal may also provide dial tone and touch tone dialing functionality for one or more receivers communicatively connected to the fixed wireless terminal. Collectively, the fixed wireless terminal, the one or more receivers and an associated network interconnecting the fixed wireless terminal and the one or more receivers form the residential phone system.

Typically, the receiver(s) are traditional corded or cordless telephones that are not functionally equipped to display a traditional text based message, such as an alert message. However, because the fixed wireless terminal interfaces with the wireless cellular network, it is capable of receiving the alert messages from the CMSP domain, as discussed above. Accordingly, because the traditional receivers included in the residential phone system do not typically display text based messages, users of fixed wireless terminals are unable to receive the text based alert messages. The system described herein delivers emergency alert messages via broadcast to fixed wireless terminals to users who would otherwise be unable to receive the emergency alert message.

Figure 1:
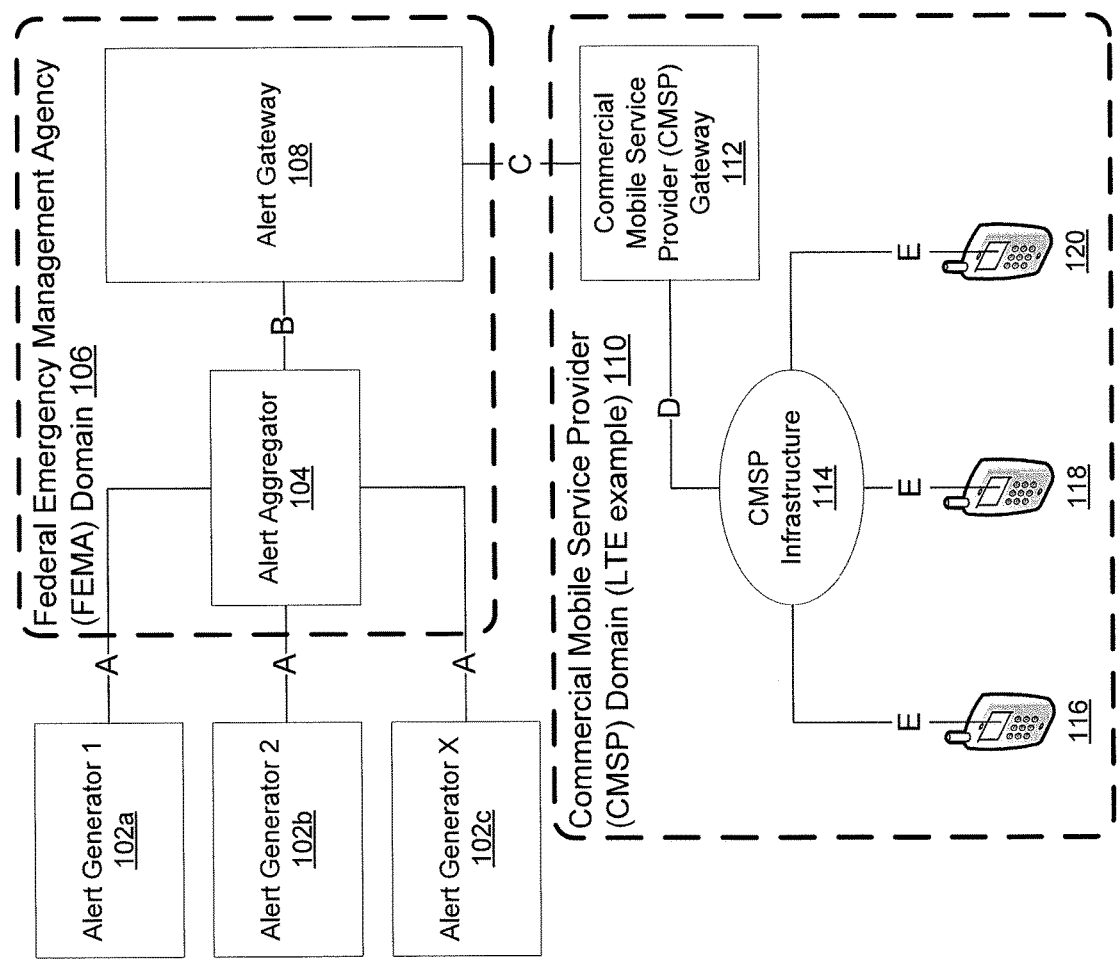
FIG. 1 is an exemplary schematic block diagram depicting an emergency broadcast message distribution infrastructure in accordance with an exemplary embodiment.

Turning to FIG. 1, an exemplary network architecture is schematically depicted. The exemplary network includes alert generators 102a, 102b, and 102c. The alert generators 102a, 102b, and 102c represent, by way of example, Federal, state, local and tribal agencies that are the originators of emergency broadcast messages distributed to mobile wireless device users.

Figure 2:
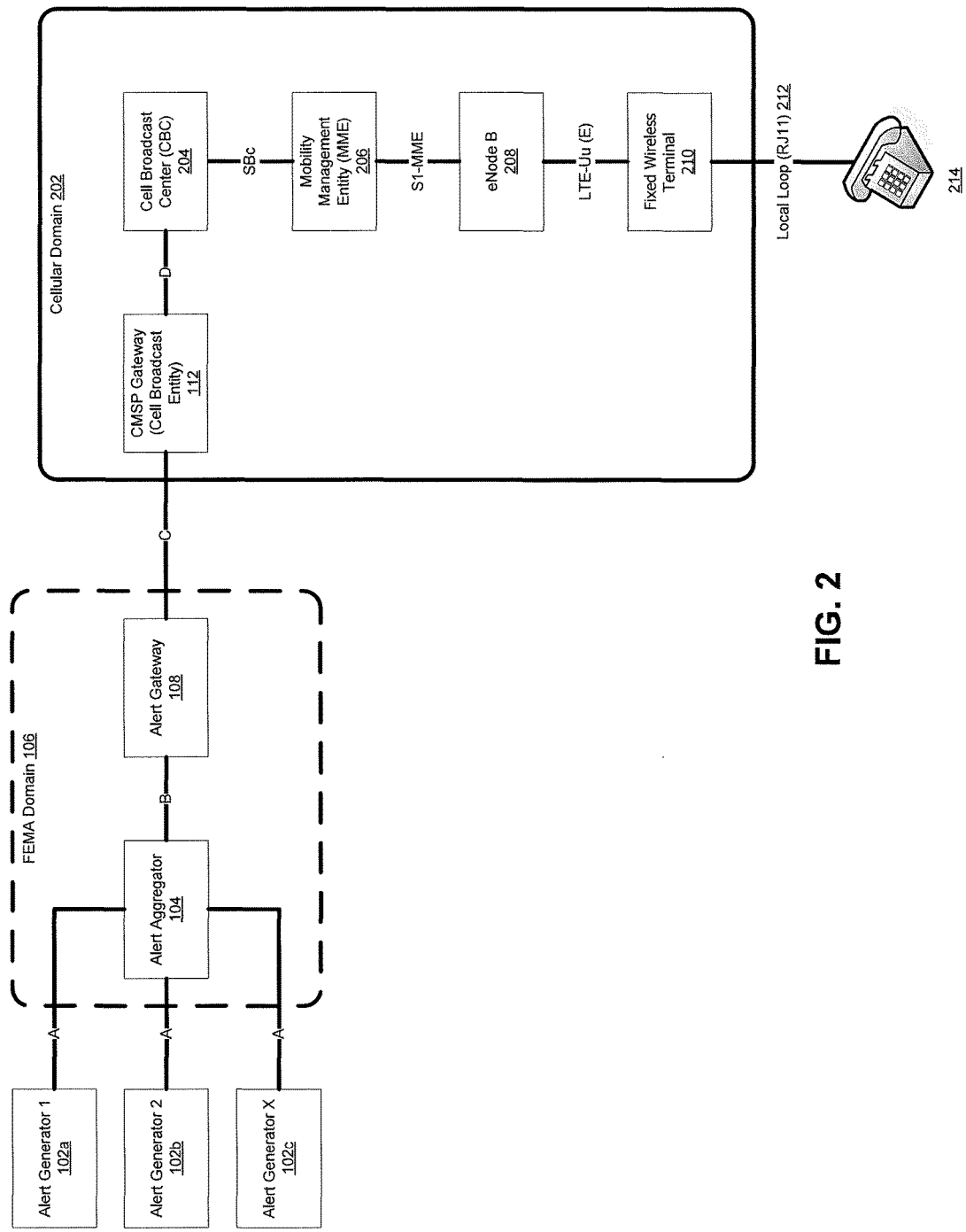
FIG. 2 is an exemplary schematic block diagram depicting the emergency broadcast message distribution infrastructure of FIG. 1 including cellular domain specific entities and residential phone system entities in accordance with an exemplary embodiment.

With continued reference to FIG. 2, an alert aggregator 104 of an FEMA Domain or alerting framework 106 receives the messages originating from the alert generators 102a, 102b and 102c via Interface A. Interface A incorporates an XML-based Common Alerting Protocol as specified in ITU-T Recommendation X.1303 (an existing protocol used for submitting emergency alerts). The alerting framework 106 is operated, for example, by an authorized government entity (e.g., FEMA). The alerting framework 106 is, in general, a server (or cluster of servers) that aggregate incoming alert messages from the alert generators 102a, 102b and 102c, and deliver the received alert messages to an alert gateway 108 via Interface B. Interface B also incorporates the XML-based Common Alerting Protocol as specified in ITU-T Recommendation X.1303.

The alert gateway 108 is a server system that is typically administered by a government entity such as FEMA. The alert gateway 108 packages raw alert messages provided by the alert aggregator 104 and transmits the packaged alert messages to commercial mobile wireless service providers including commercial mobile wireless service provider network or domain 110. In the illustrative example, the alert gateway 108 transmits the packaged alert messages via Interface C to a commercial mobile wireless service provider gateway—e.g., a cell broadcast entity (CBE) 112. Interface C is, for example, a point-to-point communication interface that incorporates an XML based protocol developed for handling interactions between an Alert Gateway and CMSP Gateway. Interface C is standardized under a joint CMAS specification document (J-STD-101) by members of the TIA and the ATIS standards organizations.

In an illustrative embodiment, the CMSP gateway 112 is a specialized application server. The CMSP gateway 112 is administered by a commercial mobile wireless service provider. The CMSP gateway 112 carries out a store and forward functionality between multiple federal alert message sources, e.g. the alert gateway 108, and a CMSP infrastructure 114.

The CMSP infrastructure 114 includes various wireless cellular network entities for various types of wireless network technologies. Via the CMSP infrastructure 114, in traditional systems, the alert message is provided to wireless client devices 116, 118 and 120 over interface E. Interface E represents the various communication standards associated with a particular wireless network such as LTE, WCDMA, UMTS, GSM, GPRS, EDGE, Wi-Fi (i.e., IEEE 802.11x), Wi-Max (i.e., IEEE 802.16), or similar telecommunication standards configured to deliver voice and data services to mobile wireless end user devices such as client devices 116, 118 and 120. Accordingly, the CMSP infrastructure 114 may be any wireless network capable of interfacing with the CMSP gateway 112. For instance, in some embodiments the CMSP infrastructure 114 may comply with one or more of LTE, WCDMA, UMTS, GSM, GPRS, EDGE, Wi-Fi, Wi-Max, or similar telecommunication standards configured to deliver voice and data services to mobile wireless end user devices such as client devices 116, 118 and 120. By way of example, the remaining discussion regarding the CMSP infrastructure 114 will be in reference to the CMSP infrastructure 114 being configured as an LTE network.

Turning now to FIG. 2, an exemplary diagram depicting the emergency broadcast message distribution infrastructure of FIG. 1 interfacing with cellular domain 202 specific entities and residential home system network entities are illustrated. Similar to FIG. 1, alert generators 102a, 102b and 102c provide raw alert messages to the alert Aggregator 104 that in turn passes the alert message to the alert gateway 108. The alert gateway 108 provides the alert message to the CMSP gateway 112, which, in the exemplary embodiment illustrated in FIG. 2, interfaces with a wireless network comprising an LTE network architecture, as the CMSP infrastructure 114 (see FIG. 1).

Figure 3:
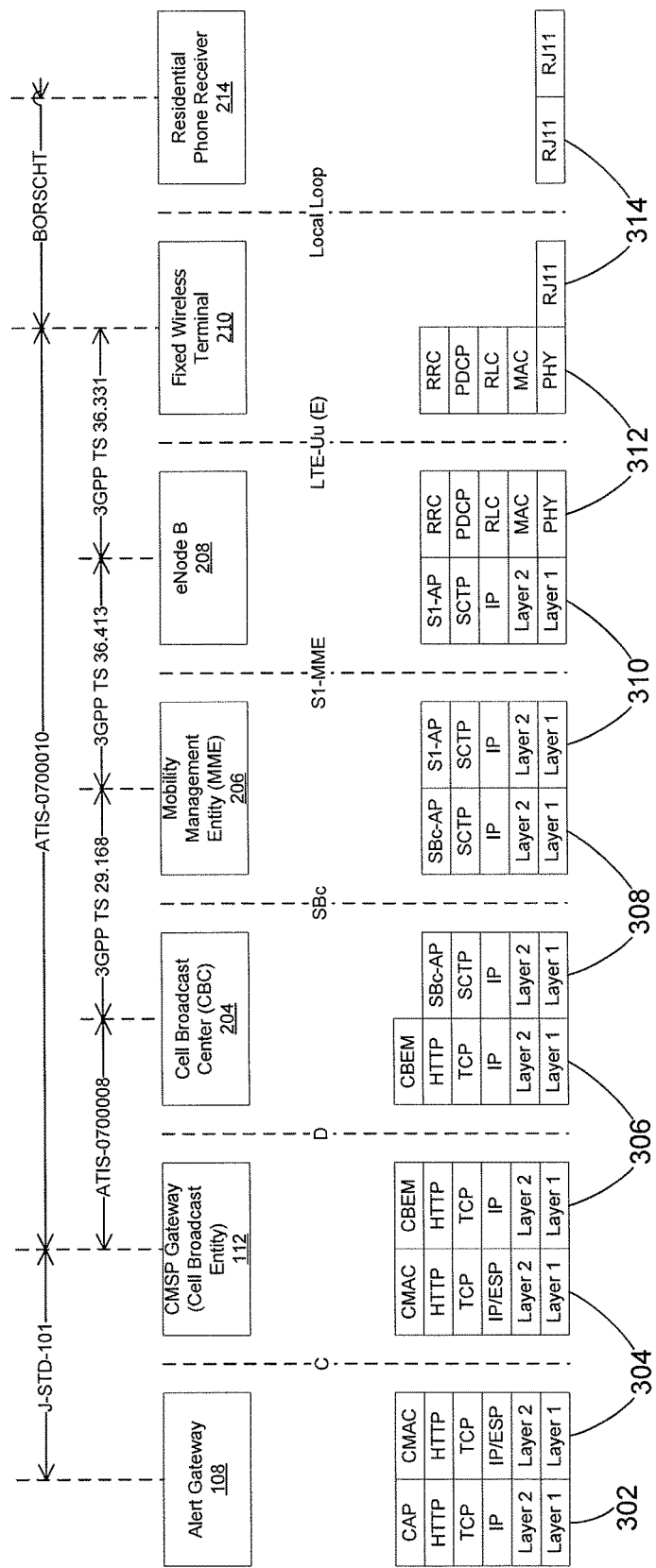
FIG. 3 is a diagram identifying of the various interfaces and data structures used to communicate between the various entities of FIG. 2 in accordance with an embodiment of the invention.

As illustrated in FIG. 2, the CMSP gateway 112 communicates with a Cell Broadcast Center (CBC) 204 over an interface D. Interface D is, as illustrated in FIG. 3, provided by the ATIS-0700008 standard, which is a Cell Broadcast Entity to Cell Broadcast Center Interface specification. The ATIS-0700008 defines a message transfer protocol on the interface between the CBE of CMSP gateway 112 and CBC 204 independent of the technology and application. In particular, ATIS-0700008 provides a common interface that is independent of the technology associated with the CMSP gateway 112 and CMSP infrastructure 114 (see FIG. 1).

The CBC 204 is an entity within a wireless network that sends Cell Broadcast messages such as the alert messages provided from the CMSP gateway 112. In certain embodiments, the CBC 204 may modify the alert message, control data associated with the alert message, or modify a transmission period or transmission repetition frequency. Once any modifications are performed, the CBC 204 sends the alert message on to applicable controllers within the wireless network.

In the illustrated embodiment of FIG. 2, the CBC 204 communicates with a Mobility Management Entity (MME) 206 over an SBc interface, as defined by the 3GPP TS 29.168 standard. The SBc interface is utilized to provide a reference point between the CBC 204 and the MME 206. The MME 206 provides an anchor for client devices, such as client devices 116, 118 and 120 (see FIG. 1) as they move within a geographic service area covered by the MME 206. In this regard, the MME 206 functions as a control node for the LTE wireless network and controls paging and tagging procedures for any associated client devices. As the fixed wireless terminal 210 is generally stationary within the residence it resides within, the MME 206 will generally function as an anchor to a single geographic area encompassing the residence supported by the fixed wireless terminal 210.

The MME 206 communicates with an eNode B 208 via an S1-MME interface defined by the 3GPP TS 36.413 standard. In this regard, the S1-MME interface provides a reference point between the MME 206 and the eNode B 208. The eNode B 208 functions as a high capacity base station for the LTE wireless network. Thereby, the eNode B 208 provides the physical protocol layer communication with the client devices, such as the fixed wireless terminal 210 of or devices 116, 118 and 120 (see FIG. 1).

The eNode B 208 and the fixed wireless terminal 210 communicate over a LTE-Uu interface (interface E from FIG. 1). The LTE-Uu interface is defined by the 3GPP TS 36.331 standard. Via the LTE-Uu interface, the alert message is provided to the fixed wireless terminal 210, which in accordance with certain embodiments, converts the text of the alert message to an audio file and transmits that audio file to various residential phone receivers 214 associated with the fixed wireless terminal 210. The transmission to the receiver 214 is done over a local loop 212 within a residence associated with the fixed wireless terminal 210. Accordingly, the residential phone system includes the fixed wireless terminal 210, the various residential phone receiver(s) 214 and the local loop 212.

In certain embodiments, the local loop 212 is defined by a Registered Jack 11 (RJ11) interface implemented as a BORSCHT standard. The electronic functions collectively known as BORSCHT are used in plain old telephone service (POTS) telephony signaling, line supervision and telephone terminal operation. BORSCHT circuitry is typically located on a telecommunications network line card and is typically integrated into chipsets for implementation of a standard POTS telephone interface for non-traditional telephony networks such as cable television networks, fiber optic networks, VoIP networks and wireless local loop networks, such as local loop 212.

As those of ordinary skill in the art will realize, the foregoing network elements illustrated in FIG. 2 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Turning to FIG. 3, the various nodes along the signaling path from the alert gateway 108 to the receiver 214 are illustrated with the various interfaces and protocol stacks associated with data communicated over these interfaces. As illustrated, the alert gateway 108 receives data from the alert aggregator 104 (see FIG. 1) in the form of stack 302. Stack 302 includes protocol layer 1 and 2 data, an IP layer, a TCP protocol layer, an HTTP protocol layer and a Common Alert Protocol (CAP) protocol layer. The alert gateway 108 operates on the data and configures the data into protocol stack 304 to be sent over interface C, as defined by the J-STD-101 standard, discussed above. Protocol stack 304 includes the same protocol layer 1 and 2 data, a IP/Encapsulating Security Payload (ESP) protocol layer, a TCP protocol layer, a HTTP protocol layer and a Commercial Mobile Alert for C (CMAC) Interface protocol layer.

Stack 304 is sent over interface C to the CMSP gateway 112, which in turn configures the data of stack 304 to be sent over interface D. As mentioned above, interface D is defined by the ATIS-0700008 standard. Stack 306 represents the protocol stack for communication between the CMSP gateway 112 and the CBC 204. Stack 306 includes the protocol layer 1 and 2 data, an IP layer, a TCP protocol layer, an HTTP protocol layer and a Cell Broadcast Entity Message (CBEM) protocol layer. The stack 306 including the CBEM is sent from the CMSP gateway 112 to the CBC 204.

The CBC 204 configures the data to be sent over the SBc interface, as defined by the 3GPP TS 29.168 standard. Stack 308 represents the protocol stack for communication between the CBC 204 and the MME 206. Stack 308 includes protocol layer 1 and 2 data, an IP layer, a TCP protocol layer, a Stream Control Transmission Protocol (SCTP) layer (defined in RFC 4960) and a SBc Application Protocol (SBc-AP) layer. The SBc-AP supports transfer of emergency alert messages. Stack 308 is sent from the CBC 204 to the MME 206.

The MME 206 reads the data received over the SBc interface and organizes it into stack 310 to be sent over the S1-MME interface to the eNode B 208. The S1-MME interface is defined by the 3GPP TS 36.413 standard. Stack 310 includes protocol layers 1 and 2, an IP layer, an SCTP layer, and a S1 Application Protocol (S1-AP) layer. The S1-AP layer is the application protocol layer between the eNode B 208 and the MME 206, and the SCTP guarantees delivery of signaling messages between the MME 206 and the eNode B 208.

The eNode B 208 organizes the data from the stack 310 into stack 312, which is suitable for transmission over the LTE-Uu interface (or interface E in general). The LTE-Uu interface is defined in the 3GPP TS 36.331 standard. Stack 312 includes a physical channel (PHY) protocol layer, a Medium Access Control (MAC) protocol layer, a Radio Link Control (RLC) protocol layer, a Packet Data Convergence Protocol (PDCP) layer and a Radio Resource Control (RRC) protocol layer. The data in stack 312 is sent to the fixed wireless terminal 210 over the LTE-Uu interface.

The fixed wireless terminal 210 receives the data from stack 312 via a wireless network interface (see FIG. 5) suitable to receive data from a wireless network, such as an LTE wireless network in the exemplary embodiment of FIGS. 2 and 3. The fixed wireless terminal 210 then proceeds to convert the data to a suitable format for transmission over the local loop 212 (see FIG. 2) to the residential phone receiver 214. As illustrated in FIG. 3, the local loop 212 is a RJ11 interface that communicates over the plain old telephone service (POTS) utilizing a BORSCHT standard, as discussed above.

Figure 4:
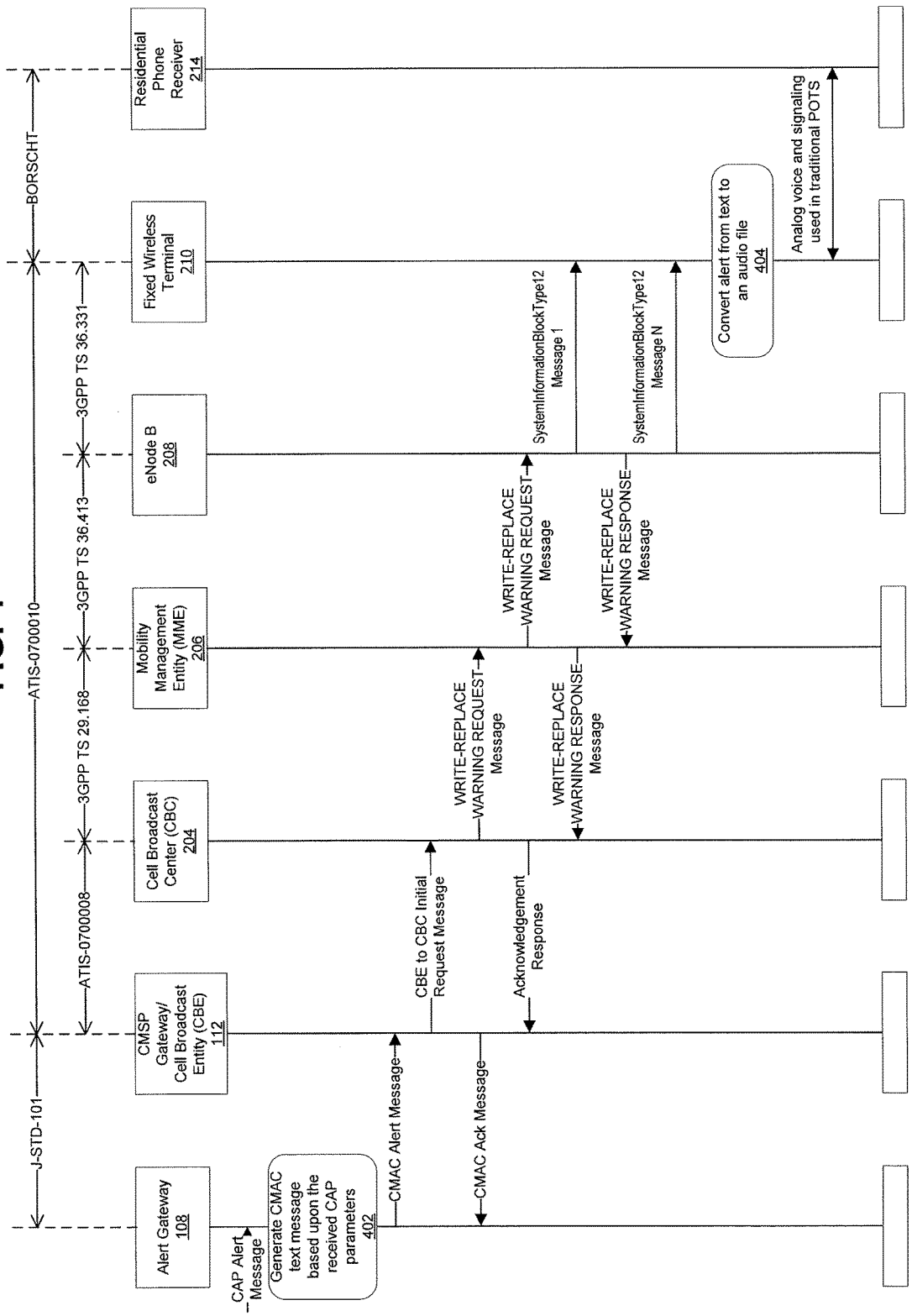
FIG. 4 is a sequence diagram summarizing a set of messaging stages/steps for implementing transmitting alert messages in accordance with an embodiment of the invention.

Turning to FIG. 4, a flowchart provides a summary of steps/stages depicting the message flow from an alert gateway 108 to a client device such as the fixed wireless terminal 210. As illustrated, the alert gateway 108 receives a Common Alerting Protocol (CAP) Alert Message from the alert aggregator 104 (see FIG. 1). At block 402, the alert gateway 108 proceeds to generate a CMAC text message based upon received parameters within the CAP alert message. The alert gateway 108 sends a CMAC Alert Message to the CMSP gateway 112, which in turn returns a CMAC Ack Message to the alert gateway 108.

Once the CMSP gateway 112 receives the CMAC Alert Message, the CMSP gateway 112 generates a CBE to CBC Initial Request Message that is sent to the CBC 204. Upon receiving the CBE to CBC Initial Request Message, the CBC 204 returns an acknowledgement response to the CMSP gateway 112 and generates a Write-Replace Warning Request Message. The CBC 204 sends the Write-Replace Warning Request Message to the MME 206.

Once the MME 206 receives the Write-Replace Warning Request Message, the MME 206 returns a Write-Replace Warning Response Message to the CBC 204 and generates a second Write-Replace Warning Request Message. The MME 206 sends the second Write-Replace Warning Request Message to the eNode B 208.

Once the eNode B 208 receives the second Write Replace Warning Request Message, the eNode B 208 returns a Write-Replace Warning Response Message to the MME 206 and generates a series of segments 1-N comprising a SystemInformationBlock Type 12 (SIB12) message. The segments of the SystemInformationBlock Type 12 message contain the CMAS emergency alert message.

In LTE wireless networks, a SystemInformationBlock message broadcasts common information to all client devices covered by the eNode B. Accordingly, in the embodiment illustrated in FIG. 4, the common information is the alert message, and the specific SystemInformationBlock Type 12 is utilized to broadcast emergency alert messages.

The SystemInformationBlock Type 12 includes several data fields, such as messageIdentifier, serialNumber, warningMessageSegmentType, warningMessageSegmentNumber, warningMessageSegment and dataCodingScheme. The messageIdentifier field identifies the source and type of alert message. The serialNumber identifies variations of the alert message. The warningMessageSegmentType indicates whether the included alert message segment is the last segment or not. The warningMessageSegmentNumber identifies a segment number of the alert message segment contained in the System Information Block, where a number of zero corresponds to the first segment, one corresponds to the second segment and so on up to N. The warningMessageSegment carries a segment of the alert message, and the dataCodingScheme identifies the alphabet/coding and the language applied variations of the alert message.

The eNode B 208 sends all segments 1-N of the SystemInformationBlock Type 12 message to the fixed wireless terminal 210. Once the fixed wireless terminal 210 receives all SystemInformationBlock Type 12 message segments 1-N, the fixed wireless terminal 210 constructs the alert message from the segments 1-N and thereby receives the alert message.

Typically, the fixed wireless terminal 210 does not include the functionality to display a text based message and generally operates to provide voice call functionality to the receiver 214, which also does not have functionality to display text based messages. In this regard, the fixed wireless terminal 210 converts the text based alert message to an audio file containing the alert message at block 404. To accomplish this conversion, the fixed wireless terminal 210 may use a text-to-speech synthesizer (see FIG. 5). Upon generation of the audio file containing the alert message, the fixed wireless terminal 210 provides the alert message to the receiver 214 over analog voice and signaling used in the traditional POTS systems.

Figure 5:
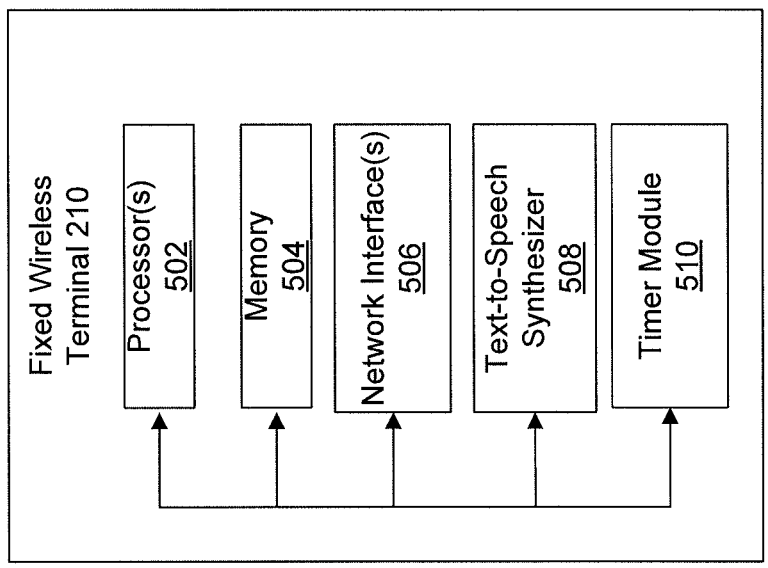
FIG. 5 illustrates a block diagram of various components of a fixed wireless terminal in accordance with an embodiment of the invention.

Turning to FIG. 5, a block diagram of an exemplary embodiment of the fixed wireless terminal 210 is illustrated. The fixed wireless terminal 210 includes one or more processors 502, memory 504, network interface(s) 506, a text-to-speech synthesizer 508 and a timer module 510.

As illustrated, processors 502 are configured to implement functionality and/or process instructions for execution within the fixed wireless terminal 210. For example, processors 502 execute instructions stored in memory 504. Memory 504, which may be a non-transient, computer-readable storage medium, is configured to store information within the fixed wireless terminal 210 during operation. In some embodiments, memory 504 includes a temporary memory, i.e. an area for information not to be maintained when the fixed wireless terminal 210 is turned off. Examples of such temporary memory include volatile memories such as random access memories (RAM), dynamic random access memories (DRAM), and static random access memories (SRAM). Memory 504 also maintains program instructions for execution by the processors 502.

The fixed wireless terminal 210 uses network interface(s) 506 to communicate with external devices via one or more wireless networks, such as the LTE wireless network illustrated in FIGS. 2-4. While the illustrated embodiments are described in terms of utilizing an LTE wireless network, other such wireless networks are contemplated. For instance, the network interface(s) 506 could receive communications from one or more of LTE, Wi-Max, Wi-Fi, GSM, CDMA2000 and WCDMA wireless networks.

The fixed wireless terminal 210 uses the text-to-speech synthesizer 508 to convert the received text based alert message to an audio file capable of being played over the receiver 214. In certain embodiments, the text-to-speech synthesizer 508 represents a state of the processor 502. Further, the text-to-speech synthesizer 508 may convert the text-based file to the audio file using a suitable speech synthesis technology. Two technologies generating synthetic speech waveforms are concatenative synthesis and formant synthesis. Formant synthesizers are usually smaller programs than concatenative systems because they do not have a database of speech samples. Therefore, in certain embodiments where memory and processing constraints are an issue, the fixed wireless terminal 210 may utilize a formant synthesizer. Further, because formant-based systems have complete control of all aspects of the output speech, a wide variety of prosodies and intonations can be output, conveying not just questions and statements, but a variety of emotions and tones of voice. Also, in other embodiments that do not include meaningful memory and processing constraints, a concatenative systems may be utilized, which take advantage of a stored database of sequences of sounds.

The fixed wireless terminal 210 utilizes the timer module 510 for setting various time-out events while processing the alert message. For instance, the fixed wireless terminal 210 may set the timer module 510 to determine a preset period of time to wait to check various condition of the receiver 214. For instance, in certain embodiments, the fixed wireless terminal 210 checks to see if the receiver is currently in use, and if the receiver 214 is in use, then the timer module 510 sets a set period of time before the fixed wireless terminal 210 will check again whether the receiver is in use. Any preset time period controlled by the timer module 510 is configurable to a variety of time periods. Further, in certain embodiments, the timer module 510 represents a state of the processor 502.

Figure 6:
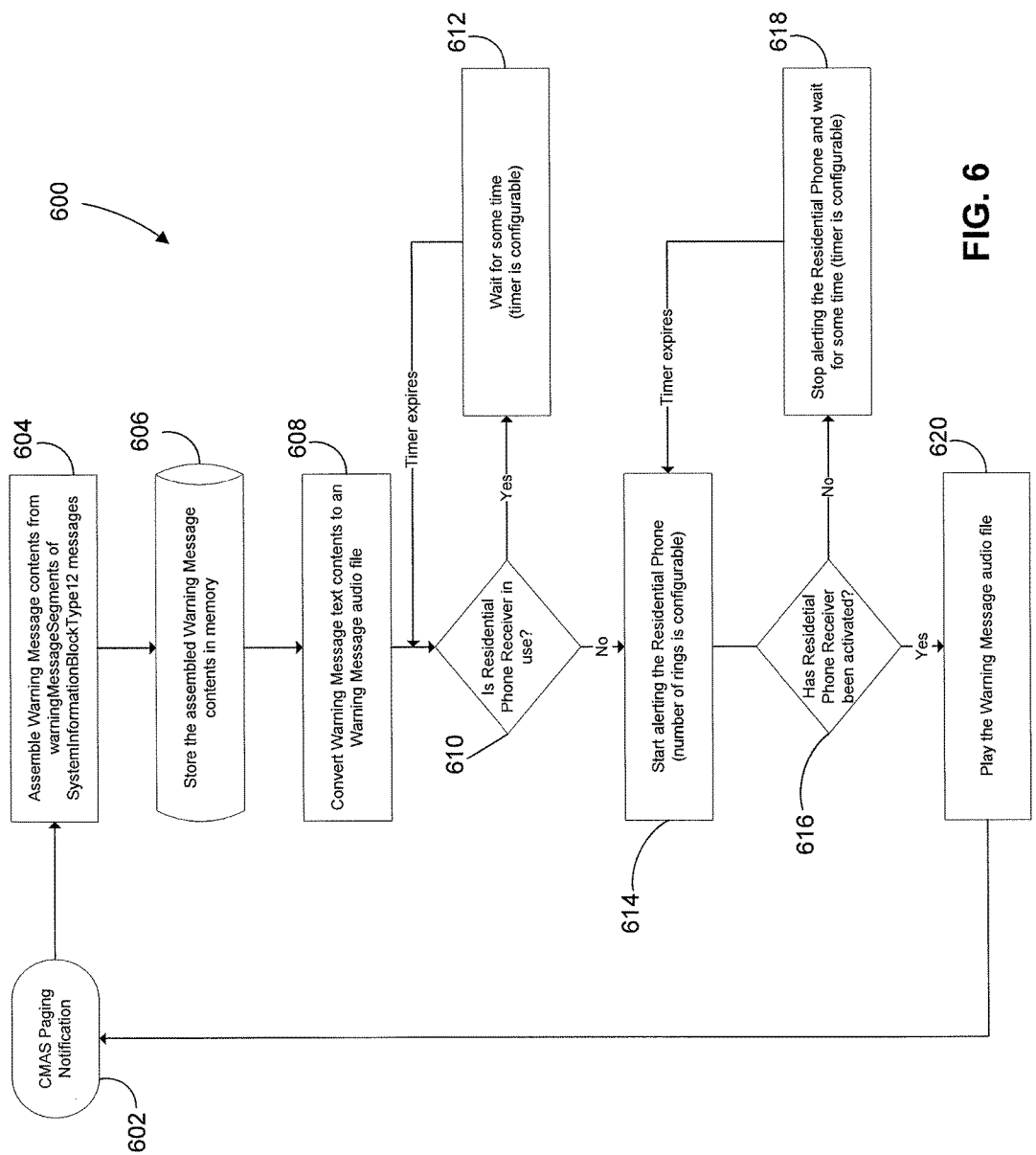
FIG. 6 is a flow chart illustrating steps performed by a fixed wireless terminal upon receiving a CMAS Paging Notification in accordance with an embodiment of the invention.

Turning to FIG. 6, a flow chart 600 illustrating steps performed by the fixed wireless terminal 210 (see FIG. 2) upon receiving a CMAS Paging Notification such as the alert message is provided. At step 602, the fixed wireless terminal 210 receives the alert message in the form of the SystemInformationBlock Type 12 message containing segments 1-N over the network interface 506 (see FIG. 5). At step 604, the fixed wireless terminal 210 assembles the alert message contents from the segments 1-N of the SystemInformationBlock Type 12 message.

Subsequent to assembling the alert message, the fixed wireless terminal 210 (see FIG. 2) stores the assembled alert message into the memory 504 (see FIG. 5) at step 606. The alert message can be stored in memory 504 for an indefinite period of time. In certain embodiments, the fixed wireless device 210 deletes the alert message after a set period of time, as determined by the timer module 510. In other embodiments, the fixed wireless device 210 stores the alert message in the memory 504 until a user of the fixed wireless device 210 deletes the alert message.

At step 608, the text-to-speech synthesizer 508 (see FIG. 5) converts the text based alert message to an audio file containing the alert message. In certain embodiments, the audio file version of the alert message is stored in the memory 504 indefinitely until deleted by a user of the fixed wireless terminal 210 (see FIG. 2). In other embodiments, the audio file version of the alert message is stored in the memory 504 and deleted after an expiration of a predefined period of time, as defined by the timer module 510.

At decision block 610, the fixed wireless terminal 210 (see FIG. 2) checks whether the receiver 214 is currently in use. In certain embodiments, if the receiver 214 is currently in use, the timer module 510 (see FIG. 5) starts a configurable timer. After expiration of the timer, the fixed wireless module 210 checks again whether the receiver 214 is in use. This process will continue until the fixed wireless terminal 210 determines that the receiver 214 is not in use.

At step 614, the fixed wireless terminal 210 (see FIG. 2) initiates an alert, such as a ringtone, at the receiver 214. The alert signals to a user of the fixed wireless terminal 210 that an alert message is available at the receiver 214. After initiating the alert at the receiver 214, the fixed wireless terminal 210 determines whether the receiver 214 has been activated (taken off-hook) at decision block 616. If the receiver 214 has not been activated after a configurable period of time, the fixed wireless terminal 210 stops the alert and the timer module 510 (see FIG. 5) starts a configurable timer, at block 618. After the expiration of the timer, the fixed wireless terminal 210 issues another alert at the receiver 214. In certain embodiments, this process will continue until the receiver 214 is activated (taken off-hook). Once the receiver 214 is answered, the fixed wireless terminal 210 sends the audio file version of the alert message over the local loop 212 to the receiver 214 at step 620.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for processing public warning messages at a residence, the method comprising:
   receiving an alert message at a fixed wireless terminal at the residence that includes the fixed wireless terminal and a receiver and where the fixed wireless terminal and the receiver are communicatively coupled over a Plain Old Telephone Service (POTS) network, and the alert message is a text-based file providing a warning message;
   converting, by the fixed wireless terminal, the alert message from the text-based file to an audio file containing the warning message;
   determining whether the receiver is currently in use;
   issuing an alert, when the receiver is not currently in use, audible at the receiver;
   determining the receiver is not taken off-hook subsequent to issuing the alert at the receiver;
   starting a timer, by the fixed wireless terminal, in response to the determining the receiver is not taken off-hook;
   reissuing the alert audible at the receiver in response to an expiration of a time period provided by the timer after the starting the timer; and
   sending the audio file from the fixed wireless terminal to the receiver over the POTS network when it is determined that the receiver is taken off-hook subsequent to the reissuing the alert at the receiver,
   wherein the alert message is contained within a Commercial Mobile Alert System (CMAS) paging notification from an evolved Node B (eNode B) of an Evolved Universal Terrestrial Radio Access Network (EU-TRAN), and
   wherein the alert message is a SystemInformationBlock Type 12 (SIB12) message comprising a plurality of segments, and wherein the method further comprises:
   assembling the text-based file of the alert message from the plurality of segments of the SIB12 message.

2. The method of claim 1, further comprising storing the text-based file of the alert message locally in a memory device at the fixed wireless terminal only for a configurable period of time after which the text-based file of the alert message is deleted.

3. The method of claim 1, further comprising:
   waiting, if the receiver is currently in use, for the timer to expire;
   determining, after expiration of the time period of the timer, whether the receiver is currently in use;
   issuing the alert, if the receiver is not currently in use after expiration of the timer, audible at the receiver; and
   determining whether the receiver is off-hook.

4. The method of claim 1, wherein the receiver interfaces with the fixed wireless terminal over a Registered Jack 11 (RJ11) interface and the audio file is sent to the receiver over the RJ11 interface.

5. The method of claim 1, wherein a number of alerts issued by the fixed wireless terminal to, and audible at, the receiver, before the receiver stops alerting, is configurable.

6. A non-transitory computer readable storage device for processing public warning messages at a residence, the computer readable storage device having computer executable instructions for performing the steps of:
   receiving an alert message at a fixed wireless terminal at the residence that includes the fixed wireless terminal and a receiver and where the fixed wireless terminal and the receiver are communicatively coupled over a Plain Old Telephone Service (POTS) network, and the alert message is a text-based file providing a warning message;
   converting, by the fixed wireless terminal, the alert message from the text-based file to an audio file containing the warning message;
   determining whether the receiver is currently in use;
   issuing an alert, when the receiver is not currently in use, audible at the receiver;
   determining the receiver is not taken off-hook subsequent to issuing the alert at the receiver;
   starting a timer, by the fixed wireless terminal, in response to the determining the receiver is not taken off-hook;
   reissuing the alert audible at the receiver in response to an expiration of a time period provided by the timer after the starting the timer; and
   sending the audio file from the fixed wireless terminal to the receiver over the POTS network when it is determined that the receiver is taken off-hook subsequent to the reissuing the alert at the receiver,
   wherein the alert message is contained within a Commercial Mobile Alert System (CMAS) paging notification from an evolved Node B (eNode B) of an Evolved Universal Terrestrial Radio Access Network (EU-TRAN), and
   wherein the alert message is a SystemInformationBlock Type 12 (SIB12) message comprising a plurality of segments, and wherein the method further comprises:
   assembling the text-based file of the alert message from the plurality of segments of the SIB12 message.

7. The computer readable storage device of claim 6 further comprising instructions for performing the step of storing the text-based file of the alert message locally in a memory device at the fixed wireless terminal only for a configurable period of time after which the text-based file of the alert message is deleted.

8. The computer readable storage device of claim 6 further comprising instructions for performing the steps of:
   waiting, if the receiver is currently in use, for a configurable timer to expire;
   determining, after expiration of the configurable timer, whether the receiver is currently in use;
   issuing an alert, if the receiver is not currently in use after expiration of the configurable timer, at the receiver; and
   determining whether the receiver is off-hook.

9. The computer readable storage device of claim 6, wherein the receiver interfaces with the fixed wireless terminal over a Registered Jack 11 (RJ11) interface and the audio file is sent to the receiver over the RJ11 interface.

10. The non-transitory computer readable storage device of claim 6, wherein a number of alerts issued by the fixed wireless terminal to, and audible at, the receiver, before the receiver stops alerting, is configurable.

11. A fixed wireless terminal for incorporation into a residential phone system at a residence including the fixed wireless terminal and one or more receivers external to the fixed wireless terminal and in communication with the fixed wireless terminal over a Plain Old Telephone Service (POTS) network, and where the residential phone system is configured to receive public warning messages, the fixed wireless terminal comprising a processor, a memory, a network interface, a text-to-speech synthesizer, and a timer, wherein the fixed wireless terminal is configured to:

receive, at the network interface, a text based alert message from a wireless cellular network;

convert, by the text-to-speech synthesizer, the text based alert message to an audio based alert message;

determine whether the one or more receivers is currently in use;

issue an alert, when the one or more receivers are not currently in use, audible at the one or more receivers;

determine a receiver of the one or more receivers is not taken off-hook subsequent to issuing the alert at the one or more receivers;

starting a configurable timer, by the timer of the fixed wireless terminal in response to the determining the receiver is not taken off-hook;

reissue the alert audible at the one or more receivers in response to an expiration of a time period of the configurable timer, in response to the starting the configurable timer; and transmit the audio based alert message to the receiver of the one or more receivers for playing the audio based alert message when it is determined that the receiver is taken off-hook subsequent to the reissuing the alert at the one or more receivers, wherein the alert message is received from a Commercial Mobile Alert System (CMAS) paging notification from an evolved node b (enodeb) of an Evolved Universal Terrestrial Radio Access Network (EUTRAN), and wherein the alert message is a SystemInformationBlock Type 12 (SIB12) message comprising a plurality of segments, and prior to the fixed wireless terminal converting the text based alert message to the audio based alert message, the first wireless terminal assembles the text based alert message from the plurality of segments of the SIB12 message.

12. The fixed wireless terminal of claim 11, wherein the one or more receivers communicate with the fixed wireless terminal over a Registered Jack 11 (RJ11) interface.

13. The fixed wireless terminal of claim 11, wherein a number of alerts issued by the fixed wireless terminal to, and audible at, the receiver, before the receiver stops alerting, is configurable.

* * * * *